United States Patent [19]

Borsuk et al.

[11] Patent Number: 4,516,829

[45] Date of Patent: May 14, 1985

[54] FIBER OPTIC CONTACT RETENTION ASSEMBLY

[75] Inventors: Leslie M. Borsuk, Los Alamitos; Patrick G. Corrales, Garden Grove, both of Calif.

[73] Assignee: International Telephone & Telegraph Corporation, New York, N.Y.

[21] Appl. No.: 377,302

[22] Filed: May 12, 1982

[51] Int. Cl.³ .................. G02B 5/14; G02B 7/26
[52] U.S. Cl. .................. 350/96.20; 350/96.10; 350/96.23
[58] Field of Search ............... 350/96.15, 96.10, 96.20, 350/96.21, 96.22, 96.23, 96.24; 174/70 R, 70 S

[56] References Cited

U.S. PATENT DOCUMENTS

| | | | |
|---|---|---|---|
| 3,947,182 | 3/1976 | McCartney | 350/96.22 |
| 3,984,174 | 10/1976 | Landgreen | 350/96.22 |
| 4,047,797 | 9/1977 | Arnold | 350/96.20 |
| 4,174,882 | 11/1979 | McCartney | 350/96.20 |
| 4,184,742 | 1/1980 | Corrales | 350/96.20 |
| 4,185,866 | 1/1980 | Corrales | 350/96.21 |
| 4,312,563 | 1/1982 | Mead | 350/96.20 |
| 4,373,777 | 2/1983 | Borsuk et al. | 350/96.20 |

Primary Examiner—William L. Sikes
Assistant Examiner—Brian M. Healy
Attorney, Agent, or Firm—T. L. Peterson; R. C. Turner

[57] ABSTRACT

A fiber optic contact retention assembly in which a fiber optic contact has an annular groove formed in its body providing front and rear shoulders. An O-ring is positioned in the groove adjacent to the rear shoulder. The contact is radially slidably mounted into a slot in a supporting yoke. One shoulder of the contact engages the front of the yoke and the O-ring is compressed between the rear of the yoke and the rear shoulder of the contact so that the contact is firmly retained in a vertical position relative to the front face of the yoke for facilitating insertion of the contact into a guide member.

13 Claims, 6 Drawing Figures

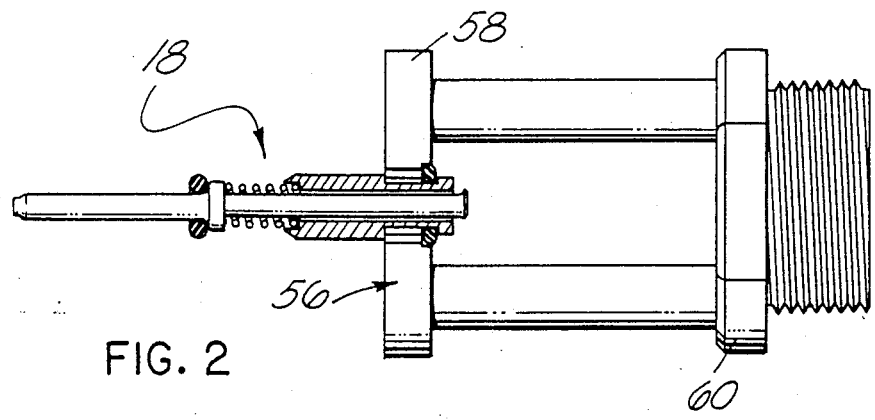
FIG. 2
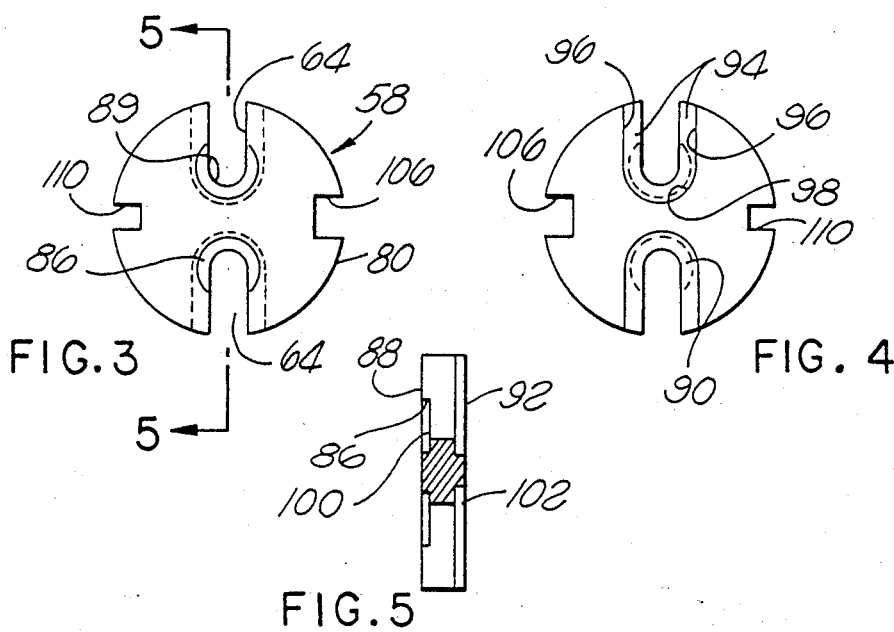
FIG. 3  FIG. 4
FIG. 5
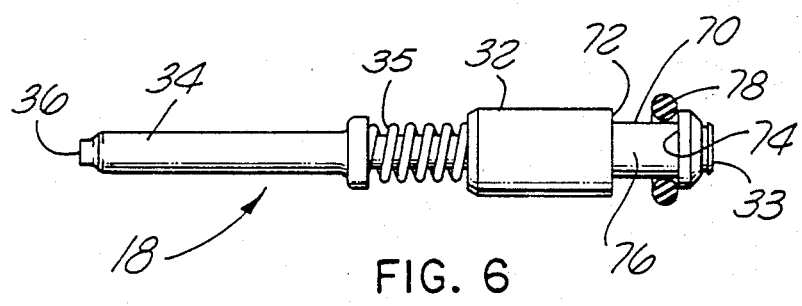
FIG. 6

FIBER OPTIC CONTACT RETENTION ASSEMBLY

BACKGROUND OF THE INVENTION

The present invention relates generally to a fiber optic connector and, more particularly, to a fiber optic contact retention assembly for such a connector.

In a typical fiber optic connector member or connector half, fiber optic contacts or ferrules are mounted in the front of an elongated yoke in the connector shell. A fiber optic cable is connected to the rear of the connector member, with the fibers therein extending through the yoke for connection to the contacts mounted on the front of the yoke. Typically springs are provided which bias the contacts in the forward direction. The forward ends of the contacts are slidably mounted in alignment passages formed in a contact guide or support member mounted in front of the yoke. When the connector member is engaged with a second connector member, the mating contacts in the two connector members will be urged rearwardly against the force of the springs whereby the forward faces of the mating contacts are assured of being maintained in firm abutting relationship. Reference is made to U.S. Pat. No. 4,184,742 to Corrales which discloses a fiber optic connector of this general type.

In another fiber optic connector member the yoke is in the form of a relatively flat disc having radial slots therein which open at the outer periphery of the disc. The contacts have annular grooves therein. The contacts are pushed radially into the slots with the grooves aligned with the yoke so that the front and rear shoulders formed by the grooves in the contacts lie adjacent to the front and rear surfaces of the yoke.

In both assemblies of the type discussed above, the contact is relatively loosely mounted in its supporting yoke. As a consequence, when the yoke with the contacts thereon are assembled to the forward contact guide member, the contacts may jam within the guide passages making assembly of the parts quite difficult, particularly if there are a relatively large number of contacts in the connector.

It is the object of the present invention to provide a fiber optic contact retention assembly in which the contacts are maintained accurately spaced and vertically positioned with respect to the front face of the yoke so that the contacts may be readily inserted into the guide passages within the forward contact support member, yet does not require additional mounting parts which would add to the complexity of design and expense in the manufacture and assembly of the contact retention assembly.

SUMMARY OF THE INVENTION

According to the principal aspect of the present invention, there is provided a fiber optic contact retention assembly in which the fiber optic contact thereof has spaced shoulders thereon preferably formed by a groove formed in the contact body. A resilient member, such as an O-ring, is mounted in the groove adjacent to one of the shoulders and spaced from the other shoulder. The contact is mounted in a slot formed in a yoke by radially sliding the contact through the slot with the groove in the contact body aligned with the yoke. One shoulder on the contact will engage the front face of the yoke while the resilient member will be compressed between the other shoulder and the rear face of the yoke which will cause the contact to be vertical with respect to the front face of the yoke. Thus, by this arrangement a plurality of contacts may be mounted on a yoke all parallel to each other and the center axis of the yoke so that a contact guide member may be mounted over the forward ends of the contacts without jamming as has occurred in the prior art arrangements. Preferably a partial counterbore is formed in the front face of the yoke around the bottoms of the slots where the contacts are mounted. The forward shoulder of each contact is firmly seated in its respective counterbore so that precise center-to-center locating of the contacts on the yoke is achieved which further facilitates the mounting of the forward contact support member over the contacts.

BRIEF DESCRIPTION OF THE DRAWINGS

FIG. 2 is a side elevational view of the mandrel utilized in the connector member illustrated in FIG. 1, showing one contact mounted on the yoke at the front of the mandrel;

FIG. 3 is a front end view of the yoke;

FIG. 4 is a rear view of the yoke;

FIG. 5 is a longitudinal sectional view taken along line 5—5 of FIG. 3; and

FIG. 6 is a side elevational view of one of the contacts utilized in the connector shown in FIG. 1.

DESCRIPTION OF THE PREFERRED EMBODIMENT

Figure 1:
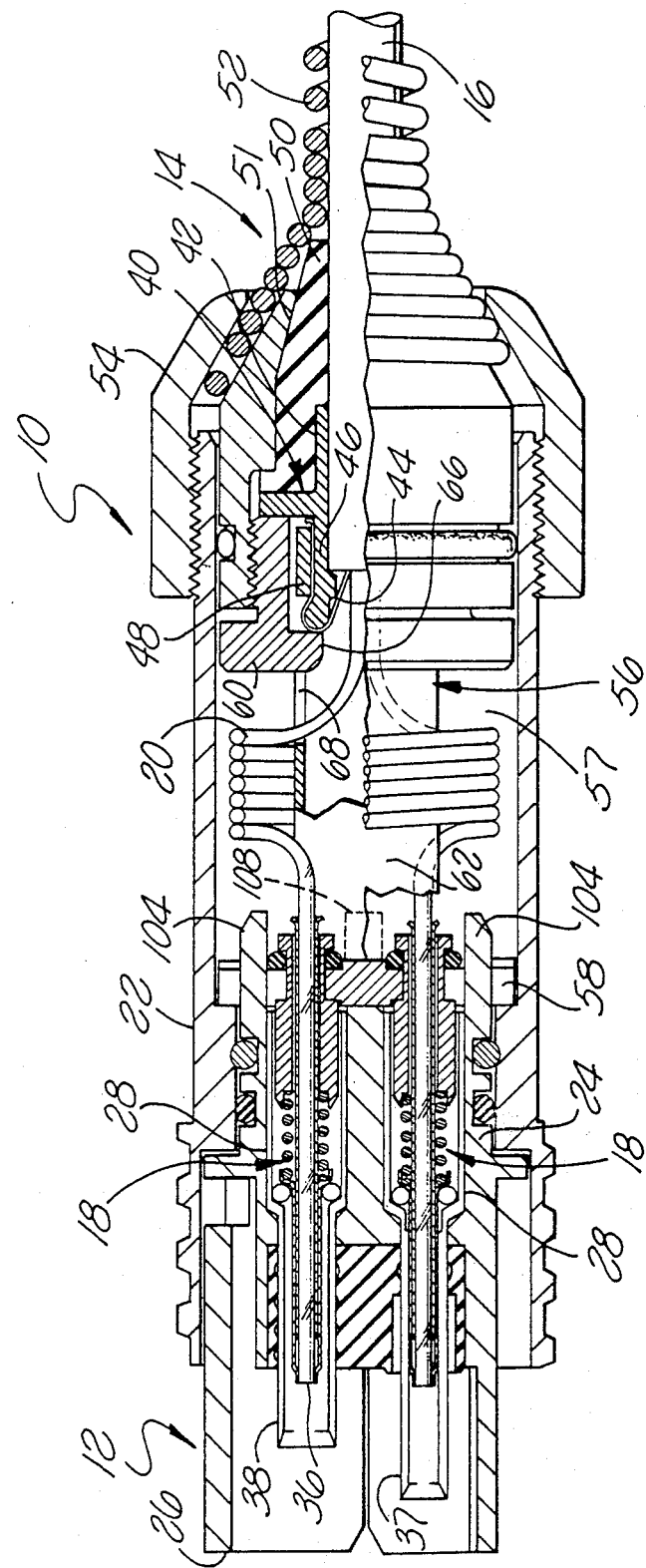
FIG. 1 is a longitudinal sectional view through a two-ferrule fiber optic connector member incorporating the present invention.

Reference is now made to FIG. 1 of the drawings in detail, which shows a fiber optic connector member, generally designated 10, having a forward mating end 12 and a rear end 14 through which there extends a fiber optic cable 16. The connector member contains two fiber optic contacts 18 each connected to an optical fiber 20 of the cable 16, only one fiber being shown in FIG. 1.

The connector member 10 is shown as being in the form of a hermaphroditic connector member, although the invention is certainly not limited to that form of connector. The connector member comprises a shell 22 having a ferrule support or guide member 24 mounted in its forward end. A polarizing flange assembly 26 extends forwardly from the support member 24 which will interengage with a like flange assembly on the mating connector member, not shown. The support member 24 contains two axially extending passages 28 each slidably receiving a fiber optic contact 18.

Each contact includes a rear, generally cylindrical hollow body 32, an inner tube 33 slidably within the body 32 and fixed to a forward fiber optic ferrule 34, and a coil spring 35 which surrounds the tube 33 in front of the body 32 and biases the ferrule in the forward direction so that when the ferrule mates with a second ferrule in the mating connector member, the ferrule may retract rearwardly against the force of the coil spring whereby the mating end faces 36 of the ferrules will be maintained in contact. The optical fiber 20 enters the contact through the inner tube 33 and terminates at the end face 36 of the ferrule.

An alignment sleeve 37 of relatively small diameter surrounds the lower ferrule 18 illustrated in FIG. 1 while a larger diameter alignment sleeve 38 surrounds the upper ferrule 18. The sleeve 38 is dimensioned to slidably receive a sleeve of the mating connector member corresponding to the sleeve 37. The sleeve 37 is dimensioned to slidably receive the ferrule of the mating connector member so that there is a telescoping interengagement between the sleeves 37 and 38 which brings the mating ferrules into precise lateral alignment.

Referring now to the rear termination end of the connector, the cable 16 passes through a crimp body 40. The rear 42 of the crimp body is crimped onto the jacket of the cable 16. The cable strength member 44 is folded back over the forward end 46 of the crimp body 40 and an outer sleeve 48 is crimped over the strength member to secure the strength member to the crimp body. A sealing member 50 surrounds the rear portion of the crimp body. A clamp ring 51 surrounds the sealing member 50 and extends forwardly over the crimp body 40. A strain relief coil spring 52 surrounds the clamp ring 51 and the cable 16 where it enters the rear of the connector. A coupling nut 54 is threaded onto the rear of the connector shell 22 to hold the spring 52 and retain the internal parts within the shell 22.

A mandrel, generally designated 56, is mounted in a flex chamber 57 which is formed between the rear of the ferrule support member 24 and the crimp body 40. The mandrel comprises a forward yoke 58 and a rear support 60 which fits over the outer crimp sleeve 48 and inside the clamp ring 51. The clamp ring is threaded on the rear support 60 to compress the sealing member 50. A longitudinally slotted hollow cylinder 62 connects the yoke 58 to the rear support 60 of the mandrel. The yoke has a pair of radially extending slots 64 therein which will receive the rear portions of the contacts 18 as will be explained in detail later. A central opening 66 is formed in the rear support 60 of the mandrel. The optical fiber 20 of the cable enters the interior of the cylinder 62 through the opening 66 in the support, and passes outwardly through a slot 68 in the cylinder into the flex chamber 57. The fiber may be wound as a coil around the cylinder to accommodate rearward movement of the contact 18 in the passage 28 upon mating of two connector halves without excessive bend radiation losses or excessive stresses applied to the fiber.

Referring to FIG. 6, an annular groove 70 is formed in the rear cylindrical body 32 of the contact 18 providing a front annular shoulder 72 and a rear annular shoulder 74. The groove 70 provides a reduced diameter section 76 in the body 32 which has a diameter slightly less than the width of the slot 64 in the yoke 58. The diameter of the body 32 of the contact in front of the shoulder 72 is greater than the width of the slot. A resilient member 78 is mounted in the rear of the groove 70 adjacent to the shoulder 74, and spaced from the shoulder 72. The resilient member 70 may be an O-ring, as shown, a Bellville spring, a "C" spring or the like. The outer diameter of the resilient member is greater than the width of the slot 64.

Referring now to FIGS. 3 to 5, the yoke 58 comprises a circular disc. The slots 64 extend radially and open at the outer periphery 80 of the disc. Since the connector illustrated in the drawings contains only two contacts, the slots 64 are shown as being diametrically opposed to each other. A partial counterbore 86 is formed in the front surface 88 of the yoke around the circular bottom 89 of each slot 64. A partial counterbore 90 is formed in the rear surface 92 of the yoke around the circular bottom of each slot. Grooves 94 are formed in the rear surface of the yoke along the sides of each slot 64. The grooves intersect the counterbore 90 so that the edges 96 of the grooves merge with the rounded side surface 98 of the counterbore.

The distance between the edges 96 of the grooves 94 on the rear surface of the yoke, and the diameter of the counterbore 90 in said surface, are greater than the diameter of the resilient member 78 of the contact so that said member will freely slide through the grooves to the counterbore 90 when the contact is mounted in the slot 64. In the arrangement shown, the diameter of the counterbore 90 is greater than that of the counterbore 86. The distance between the bottom 100 of the counterbore 86 and the bottom 102 of the counterbore 90 on the rear of the yoke is slightly greater than the distance between the shoulder 72 on the contact 18 and the resilient member 78.

The contact is assembled in one of the slots of the yoke by first aligning the reduced diameter section 76 of the rear body 32 with the yoke and pushing the contact radially inwardly through the slot until the contact seats at the bottom of the slot. As the contact slides inwardly into the slot, the resilient member 78 will slide freely through the grooves 94 and become seated within the counterbore 90. Since the distance between the shoulder 72 and the resilient member 78 is less than the distance between the bottoms of the counterbores on the front and rear of the yoke, the resilient member will be compressed when the contact is mounted in the yoke, thereby providing a spring force which holds the contact perpendicular to the front surface of the yoke. Also, as mentioned previously, the contact body 32 in front of the shoulder 72 will become firmly seated within the counterbore 86 in the front surface of the yoke thereby precisely locating the contact on the yoke. The centers of the counterbores 86 in the front surface of the yoke are precisely positioned so that when the contacts are mounted with the shoulders 72 seated in the counterbores 86, the contacts will be accurately positioned for easy sliding into the contact passages in the support member 24 of the connector.

Four equally spaced, rearwardly extending extension fingers are formed on the support member 24. Three of the fingers 104 (only two being visible in FIG. 1) have a width slightly less than the width of the slots 64 and of a shorter like slot 106 in the yoke 58. The fourth finger 108 is narrower than fingers 104 and is dimensioned to fit within a corresponding narrow slot 110 in the yoke. The three fingers 104 and finger 108, fit into the three matching slots 64, 106 and slot 110, respectively, when the support member 24 is assembled to the mandrel to polarize the two parts.

While the resilient member 78 has been described as being mounted on the contact, it could also be mounted on the yoke 58. For example, the resilient member could be a "C" shaped elastomeric ring which is affixed within the counterbore 90, with the gap in the "C" ring aligned with the slot 64. Alternatively, the "C" ring could be an integral lip molded on a yoke formed of an elastomeric material, such as rubber. In either case, the grooves 94 could be eliminated. It is further possible to simply provide an elastomeric yoke having a width around the bottom of the slots 64 slightly greater than the distance between the shoulders 72 and 74 on the contact.

While the reduced section 76 of the rear body 32 of the contact has been described as being formed by an annular groove, and therefore of circular configuration, in an alternative embodiment the reduced section could be formed with two parallel flat sides spaced apart a distance slightly less than the width of the slot 64 in the yoke. By this arrangement, the contact 18 would be prevented from rotating in the yoke.

Thus, it is seen that by the present invention there is provided a one-piece yoke in which the contacts may be precisely mounted and retained in their desired perpendicular orientation with respect to the front surface of the yoke, thus avoiding the necessity of having an expensive multi-piece arrangement to achieve the same result.

What is claimed is:

1. A fiber optic contact retention assembly comprising:
    a fiber optic contact having spaced shoulders thereon facing each other;
    a yoke having a slot therein extending axially therethrough and opening at its outer periphery;
    said contact being mounted radially inwardly into said slot with one shoulder engaging one side of said yoke and the other shoulder being spaced outwardly from the other side of said yoke;
    resilient means between said other shoulder and said other side of said yoke; and
    said resilient means being compressed between said other shoulder and said other side of said yoke.

2. A fiber optic contact retention assembly as set forth in claim 1 wherein:
    said resilient means is a resilient member mounted on said contact.

3. A fiber optic contact retention assembly as set forth in claim 2 wherein:
    said resilient member is an O-ring.

4. A fiber optic contact retention assembly as set forth in claim 1 wherein:
    a partial counterbore is formed in said one side of said yoke firmly receiving therein said one shoulder of said contact.

5. A fiber optic contact retention assembly comprising:
    a fiber optic contact having spaced shoulders thereon facing each other;
    an annular resilient member on said contact adjacent to one of said shoulders and spaced from the other shoulder;
    a yoke having front and rear surfaces, and an outer periphery;
    a slot in said yoke extending from said front surface to said rear surface and opening at said outer periphery;
    the bottom of said slot being circular;
    a partial counterbore formed in each of said surfaces of said yoke around the circular bottom of said slot;
    grooves formed in one of said surfaces along the sides of said slot and intersecting the counterbore formed in said one surface;
    the diameter of said counterbore in said one surface being greater than the diameter of said annular resilient member;
    the distance between the edges of said grooves being greater than the diameter of said annular resilient member;
    the diameter of said counterbore in said other surface being slightly greater than the diameter of said contact adjacent to said other shoulder; and
    said contact being radially, slidably mounted into said slot with said other shoulder firmly fitting within the counterbore in said other surface, and said resilient member being compressed between the bottom of said counterbore in said one surface and said one shoulder.

6. A fiber optic contact retention assembly as set forth in claim 5 wherein:
    said shoulders are formed by a groove in said contact.

7. A fiber optic contact retention assembly comprising:
    a fiber optic contact having a body formed with an annular groove providing a reduced diameter section;
    a resilient member mounted adjacent to one end of said groove and spaced from the other end of said groove a predetermined distance;
    a yoke having front and rear surfaces, and an outer periphery;
    a slot extending through said yoke from said front surface to said rear surface, and opening at said outer periphery;
    the distance between said front and rear surfaces being greater than said predetermined distance;
    said slot having a width less than the diameter of said contact body but greater than the diameter of said reduced diameter section; and
    said contact being radially, slidably mounted into said slot with said reduced diameter section lying within said slot, one of said yoke surfaces bearing against said other end of said groove and said resilient member being compressed between said yoke and said one end of said groove.

8. A fiber optic contact retention assembly comprising:
    a fiber optic contact having a forward mating end and a rear mounting end;
    an annular groove formed in said rear mounting end providing a reduced diameter section between front and rear annular shoulders;
    a resilient member in said groove adjacent to said rear shoulder;
    a yoke having front and rear surfaces, and an outer periphery;
    a slot in said yoke extending between said front and rear surfaces, and opening at said outer periphery;
    a partial counterbore formed in the front surface of said yoke around said slot; and
    said contact being radially slidably mounted into said slot with said front shoulder thereof positioned firmly within said counterbore, and said resilient member being compressed between a rearwardly facing surface on said yoke and said rear shoulder on said contact.

9. A fiber optic contact retention assembly as set forth in claim 8 wherein:
    said resilient member is an O-ring.

10. A fiber optic contact retention assembly as set forth in claim 8 wherein:
    a second partial counterbore is formed in the rear surface of said yoke concentric with said first-mentioned counterbore, the bottom of said second counterbore provides said rearwardly facing surface.

11. A fiber optic contact retention assembly as set forth in claim 10 wherein:
    grooves are formed in said rear surface along the sides of said slot and intersecting said second counterbore, the distance between the edges of said grooves and the diameter of said second counterbore being greater than the diameter of said resilient member.

12. A fiber optic contact retention assembly comprising:
- a plurality of fiber optic contacts;
- each said contact having a forward mating end and a rear mounting end;
- an annular groove formed in said rear mounting end of each contact providing a reduced diameter section between front and rear annular shoulders;
- an annular resilient member in said groove of each said contact adjacent to said rear shoulder;
- a yoke having front and rear surfaces, and an outer periphery;
- a plurality of slots in said yoke extending between said front and rear surfaces, and opening at said outer periphery;
- a partial counterbore formed in the front surface of said yoke around each said slot, said counterbores being precisely positioned relative to each other; and
- said contacts being radially slidably mounted into said slots with said front shoulders thereof positioned firmly within said counterbores, and said resilient members being compressed between a rearwardly facing surface on said yoke and said rear shoulders on said contacts.

13. A fiber optic contact retention assembly as set forth in claim 1 wherein said contact comprises:
- a hollow body having an inner tubular member slidable therein, said tubular member being adapted to receive an optical fiber therein;
- said spaced shoulders being formed on said hollow body;
- a rearwardly facing shoulder on said tubular member in front of said hollow body; and
- spring means between said rearwardly facing shoulder and said hollow body for resisting rearward movement of said tubular member in said hollow body.

* * * * *